May 9, 1939. G. A. LYON 2,157,960
ORNAMENTAL WHEEL DISK
Filed Dec. 17, 1934
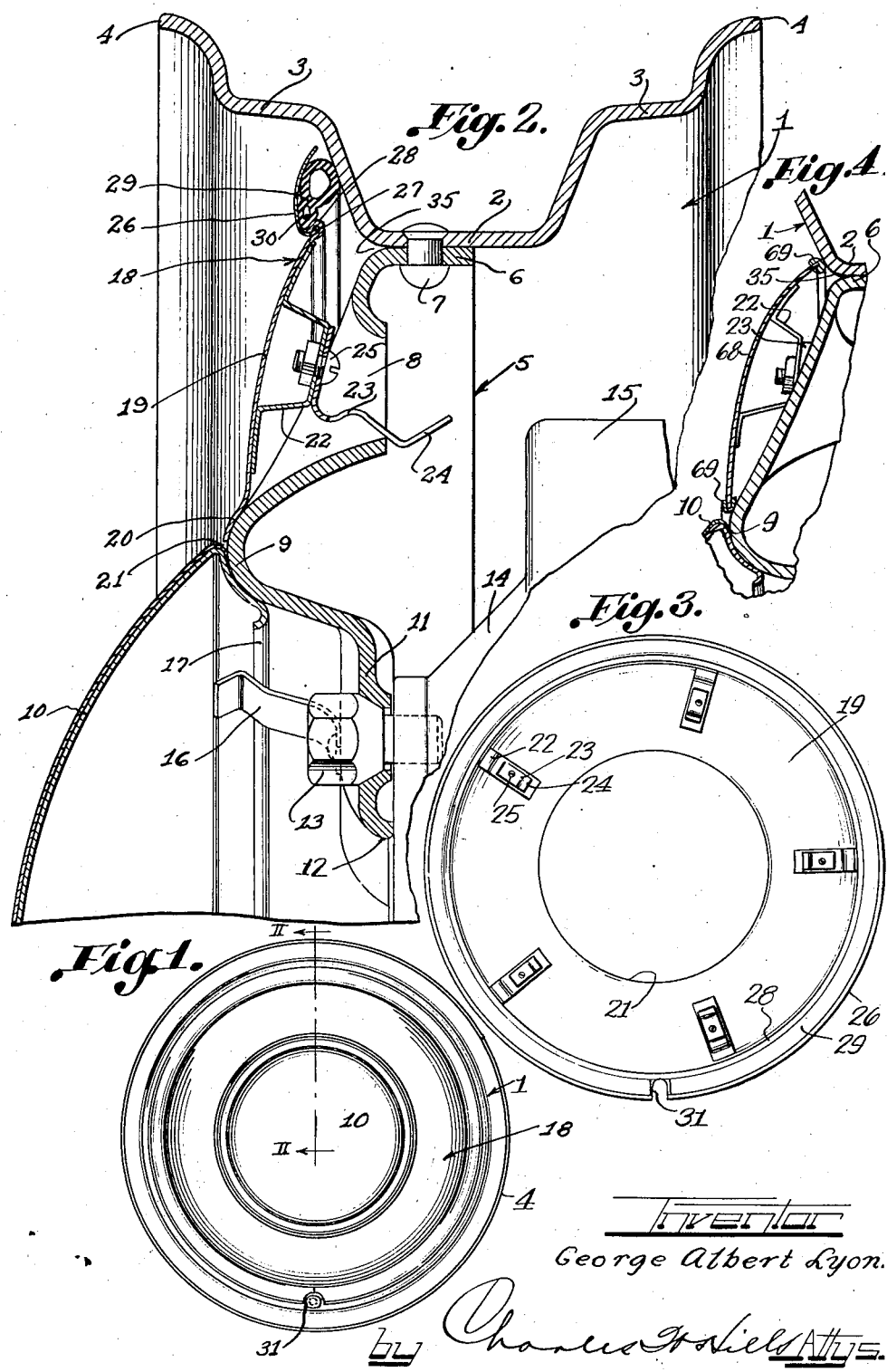
Inventor
George Albert Lyon.

Patented May 9, 1939

2,157,960

UNITED STATES PATENT OFFICE 2,157,960

ORNAMENTAL WHEEL DISK

George Albert Lyon, Detroit, Mich.

Application December 17, 1934, Serial No. 757,781

4 Claims. (Cl. 301—37)

This invention relates to improvements in ornamental wheel disks, and more particularly, to an ornamental disk for attachment to the side surface of a vehicle wheel within the rim of the wheel to overlie the outer side surface of the disk or spoke portion of the wheel. The invention further relates to an ornamental disk and wheel structure wherein the retaining engagement between the wheel and disk is adjacent or a little inside of the wheel rim.

The present invention is shown and described herein in several different forms associated with a vehicle wheel of the so-called disk type, wherein the wheel normally includes a tire rim usually of the drop center type and a body part or central portion secured to the rim, this body part being centrally apertured to provide a hub opening, and extending from this aperture to the base flange of the rim to which it is secured in any suitable manner. However, it is to be understood that while the present invention embodies an ornamental disk for association with a vehicle wheel and also an ornamental disk and wheel structure, where in each instance a disk wheel is highly desirable, with relatively minor structural changes the invention can equally as well be associated with or incorporate wheels of other types.

In the manufacture on a large production basis of wheels of the disk type, the body or central supporting part is usually blanked or pressed out of relatively heavy gauge sheet material, and so it is not feasible to provide the outer side surface of this part with a high grade finish. To provide a finish on the body part of the wheel that would be in keeping with the other appointments of the vehicle necessitates grinding and buffing operations after the forming of the part, thereby adding so materially to the cost of the part as to render the same prohibitively expensive, not only in the original manufacture but also to replace after injury. In addition, the body or central supporting parts of disk wheels are sometimes of solid construction of substantially the same thickness throughout, and in other cases they are formed with apertures and indentations to cause such parts to simulate spokes.

With the foregoing in mind, it is an object of this invention to provide an ornamental disk of relatively thin sheet material and having an external surface, finished or configurated in substantially any desired manner to harmonize with the other structure and adornments of the vehicle, which disk element is economical and expeditious to manufacture and may be associated with the wheel in a very ready manner.

It is another object of this invention to provide an ornamental disk to overlie a portion of the outer side surface of a wheel within the rim of the wheel, which disc may be associated with a slight change in construction with either a solid smooth surfaced central part of a wheel or a central part of a wheel made in simulation of spokes.

Also an object of this invention is the provision of an ornamental disk and wheel structure wherein the attaching means for holding the disk upon the wheel may either be carried by the disk or by the wheel, as may be deemed desirable.

Another object of this invention is the provision of an ornamental disk having means thereon for engagement through the spoke holes of the central portion of a wheel to hold the disk in position upon the wheel.

Heretofore, in the event the ornamental disk was not formed so as to include a portion for covering the hub opening of a wheel, it was necessary to remove the hub cap in order to position the ornamental disk upon the wheel, or leave a portion of the wheel structure immediately adjacent the hub opening exposed. In the event the ornamental disk is purchased as an accessory to be put in position upon the wheel by the user, removal and replacement of the hub cap is an inconvenience.

Accordingly, it is another object of this invention to provide an ornamental disk for association with the outer side surface of a vehicle wheel, which disk may be placed upon or taken off the wheel without removal of the hub cap.

Also an object of this invention is the provision of an ornamental disk for covering the outer side surface of a wheel between the hub cap and rim, which disk may be mounted upon the wheel without the removal of the hub cap and after mounting gives the external appearance of continuity between the hub cap and disk.

Still another object of this invention is the provision of an ornamental disk for overlying the outer side surface of a wheel between the hub cap and rim, which disk may be applied to the wheel without the removal of the hub cap, and which disk terminates inwardly in spaced relationship to the hub cap leaving exposed a band of color upon the central supporting part of the wheel, whereby desired color blending may be obtained.

Another object of the invention is to provide a disk adapted to be snapped axially into spring retained engagement with an outer side of the wheel and which structure includes concealed spring elements adapted to adjust the disk to slight manufacturing tolerances allowed in the manufacture of the wheel.

It is also an object of this invention to provide an ornamental disk which may be positioned upon a wheel to cover the outer side surface of the wheel inside the outer edge of the rim, with the engagement means between the disk and the wheel adjacent the rim, and wherein the disk may be made to include as an integral part thereof the equivalent of a hub cap, in which instance the disk is removable from the wheel or, if desired, the disk may be made so as not to include the equivalent of a hub cap portion.

It is also an object of this invention to provide an ornamental disk of the character described herein which may or may not be equipped with a cushioning or yieldable member for contact with the rim of the vehicle wheel as may be desired.

Another object of the invention is the provision of a new ornamental disk and wheel structure, the engagement between these parts being adjacent the rim of the wheel.

It is also an object of this invention to provide an ornamental disk for mounting over the side surface of a vehicle wheel inside the outer edge of the rim of the wheel, which disk may be placed upon the wheel and also pried off the wheel with a suitable implement fulcruming against the rim of the wheel without contact with the tire, all without necessitating the removal of the hub cap from the wheel.

It is also an object of this invention to provide an ornamental disk for disposition over the side surface of a vehicle wheel inside the outer edge of the rim of the wheel, which disk incorporates as a part thereof yieldable means for contact with the wheel rim.

A further object of this invention is the provision of an ornamental disk for disposition over the side surface of a vehicle wheel within the outer edge of the rim, which disk is pressable axially into spring retained engagement with the wheel without the removal of the hub cap from the wheel, and which disc carries as an integral part thereof cushioning or yieldable means for contact with the rim of the wheel as well as with the central supporting portion of the wheel.

Other objects and features of this invention will more fully appear from the following description taken in conjunction with the accompanying drawing, which illustrates several embodiments thereof, and in which:

Figure 1 is a side view of an ornamental wheel disk structure embodying features of this invention;

Figure 2 is an enlarged fragmentary sectional view taken substantially on the line II—II of Figure 1, looking in the direction indicated by the arrows;

Figure 3 is an enlarged elevational inside view of the disk itself, this being the same disk seen in Figures 1 and 2;

Figure 4 is an enlarged fragmentary sectional view similar to Figure 2, but showing a disk construction carrying as an integral part thereof yieldable means for engagement not only with the rim of the wheel but also with the central supporting portion of the wheel.

I have illustrated in the above mentioned drawing a number of modifications of my invention, in each of which I have provided an ornamental disk and wheel structure in which a disk is adapted to be snapped or pressed axially into retained engagement with the wheel so as to be held in place on the wheel by means concealed by the disk.

In the first form of my invention which is illustrated in Figures 1, 2 and 3 of the accompanying drawing, the reference numeral 1 indicates in general a drop center rim or rim part of a wheel, this rim part including a base 2, a pair of intermediate flanges 3—3, and a pair of outer edges 4—4. The wheel also includes a central supporting portion or body part indicated in general by the reference numeral 5, which part includes an inwardly turned peripheral flange 6 secured to the base 2 of the rim in any suitable manner, such as by rivets 7. In this instance, the body part 5 is also provided with a plurality of apertures or openings 8 in simulation of the spaces between spokes, the portions of the metal of the body part adjacent each aperture being depressed inwardly, as seen in Figure 2, to give the general external appearance of a spoked wheel. Inside the opening 8 the body part is provided with an outwardly projecting annular bulge 9 which, in addition to other functions, also acts as a seat for a hub cap 10. Radially inward of the bulge 9 the body part is provided with an inwardly offset fastening flange 11 provided with a central hub opening 12 and also provided with a plurality of apertures for the accommodation of a series of fastening bolts 13 by means of which the wheel may be attached to an axle part 14 having associated therewith the usual brake drum 15. The fastening flange 11 is provided with a series of spaced spring clips 16 extending outwardly in position to engage the inner curled periphery 17 of the hub cap 10 to retain the hub cap removably in position.

As stated hereinabove, it is prohibitively expensive to provide the outer surface of the body part 5 of the wheel with a high grade finish in keeping with the finish on other parts of the vehicle, it being customary to provide this surface with a relatively economical coating of paint, lacquer, enamel or the equivalent. Accordingly, it is found more economical and satisfactory to provide an ornamental disk for disposition over this outer side surface of the body part.

In this instance, I have provided an ornamental disk generally indicated by reference numeral 18 which includes a transversely arcuate body portion 19 merging radially inwardly into a bulged portion 20 shaped to seat on the bulge 9 of the body part 5, and provided with a central aperture 21 slightly larger than the maximum circumference of the hub cap 10.

The portion 19 of the disk 18 is provided with a plurality of spaced brackets 22 welded or otherwise secured to the disk. In this instance, as seen best in Figure 3, five of these brackets are used, although any desirable number may be provided. To each of the brackets 22 a spring clip 23 terminating in an outwardly bent end 24 is secured by means of bolts 25 or in any other suitable manner. The spring clips 23 are arranged to extend through the openings 8 in the body part of the wheel and engage over the radially inward edge of the metal around these openings to hold the disc upon the wheel, as best seen in Figure 2.

In this instance, the disk 18 is provided around the outer periphery thereof with an ornamental bead or band 26 which is arcuate in cross-section and provided with an underturned flange 27 rigidly embraced by a reverse roll 28 in the outer margin of the disk. The band 26 is arcuate in cross-section and together with the roll 28 provides a groove-like formation in which is seated a cushioning or yieldable member 29 for contact with the surface of the tire rim 1. The cushioning member 29, in this instance, is shown in the form of a tubular member having substantially a cross-section like a figure eight and being made preferably of live rubber. The inside or smaller tube contains an endless rust-proof wire 30 which holds the member seated in the groove formation, permitting the outer or larged tubular portion to be free for contact with the tire rim to eliminate rattling or other similar noises. As seen best in Figures 1 and 3, the band 26 is provided with a notch 31 through which the valve of a pneumatic tire mounted on the rim 1 may extend. The cushioning member 29 terminates upon each side of the notch, but the wire 30 preferably does not terminate, this wire being seated below the inner edge of the notch.

From the above description, it will be seen that my improved disk may be mounted upon a wheel simply by pressing the disk radially or axially inwardly until the spring members 23 have engaged the body part 5 of the wheel through the openings 8. In mounting the disk upon the wheel, it is not necessary to remove the hub cap 10. When the spring members are engaged with the body part of the wheel, the portion 20 of the disk seats against the bulge 9 of the hub part, and the cushioning member 29 contacts with the wheel rim, thereby insuring a rigid, tight fit of the disk upon the wheel, tending to eliminate objectionable noises. With such construction, variations within the manufacturing tolerances in displacement of the hub part of the wheel relatively to the rim thereof are automatically compensated for by the positioning of the disk.

It will be noted that in the particular instance above described, the aperture 21 in the disk may be made very nearly the size of the hub cap, as shown in Figure 2, so that after mounting the disk gives an external appearance of continuity with the hub cap.

However, if so desired, the aperture 21 in the disk may be made larger in size so as to leave visible a band-like portion of the body part 5 which is usually covered with paint, lacquer or the like, thus providing a desirable color scheme. Of course, the outer surface of the disk is finished in any desired manner with coloring matter or plating and polishing as may be desired. The use of a larger aperture in the disk with a portion of the body part of the wheel showing is seen in Figure 4, which will be later described herein. With the use of a proper color scheme on the disk, hub cap and body part, or any of them, as the case may be, an external appearance of continuity between the disk and hub cap may result even though a portion of the body part is distinctly visible.

The disk structure shown in Figures 1, 2 and 3 may be removed from the wheel without necessitating the removal of the hub cap 10. One way of removing the disk is to insert a suitable prying tool beneath the circumferential edge of the band 29, and pry the disk off the wheel by fulcruming the tool against the axially outward portion of the intermediate flange 3 of the rim. It will be seen that when the tool is so used, the tool will not contact with the tire mounted upon the rim. In some instances, however, such a method will not be entirely satisfactory, and if that is the case, it is a simple expedient to remove the disc from the wheel by releasing certain of the spring clips from the inside of the wheel. If three adjacent spring clips are released simultaneously, the respective portion of the disc will project axially outwardly from the wheel sufficiently to permit the disk to be easily lifted off the wheel.

In Figure 4 I have shown a disk of the nature of that shown in Figure 2 mounted upon a wheel of the same structure as that shown in Figure 2. In this instance, the disk 68 is arced so that the outer edge portion thereof extends towards the rim 1, and the inner edge portion thereof extends towards the bulge 9 on the body part 5 of the wheel. The disk is mountable upon and removable from the wheel in the manner described in connection with the disk 18 and uses the same engaging means as shown in connection with the disk 18 in Figure 2. The inner edge of the disk is spaced slightly from the hub cap 10 of the wheel so that the disk may be placed upon the wheel or removed therefrom without necessitating the removal of the hub cap.

To insure yieldable contact with both the rim and the bulge 9 of the body part of the wheel, the disk is provided along each circumferential edge thereof with a yieldable bead 69. These beads 69 are preferably of live rubber and are attached to the disk in any desirable manner, such as by dipping, molding or vulcanizing. The spring clips 23 secured to the disk together with the yieldable contact members 69 hold the disk rigidly in position upon the wheel and substantially eliminate all unwelcome noises.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. As an article of manufacture, an ornamental wheel disk adapted to be applied over an outer side of a wheel between the rim and hub or body portions of the wheel and having concealed means adapted when the disk is pressed against the outer side of the wheel to engage the body portion for securing the wheel thereto, said concealed means including a plurality of stirrups secured to the rear face of said disk, and a plurality of L-shaped spring elements each having an axially extending leg for detachable engagement with said body portion and a radially extending leg secured to one of said stirrups.

2. As an article of manufacture, an ornamental wheel disk adapted to be applied over an outer side of a wheel between the rim and hub or body portions of the wheel and having concealed means adapted when the disk is pressed against the outer side of the wheel to engage the body portion for securing the disk thereto, said concealed means including a plurality of stirrups secured to the rear face of said disk, and a plurality of L-shaped spring elements each having an axially extending leg for detachable engagement with said body portion and a radially extending leg bolted to one of said stirrups.

3. In an ornamental member and wheel structure including a wheel rim, a body part connected thereto and having a central opening closed by a hub cap, and an ornamental member having a central opening larger than said hub cap, said ornamental member being arranged to bear against the side of said rim and against said body part, the combination therewith of resilient snap-on holding means on one of said parts for holding the ornamental member on the wheel, said means being completely concealed behind the ornamental member and being connected to said ornamental member and to said body part at points intermediate said bearing points of said ornamental member against said rim and body parts so as to effectively hold said ornamental member and said wheel together at both of said bearing points.

4. In combination, a pressed steel wheel having apertures and portions between the apertures to simulate spokes, a hub cap covering the central portion of the wheel, an ornamental sheet metal member lying against the face of the wheel closely around the hub cap and having a central aperture larger than said hub cap for permitting the independent application and removal of said hub cap and said ornamental member, and means for detachably securing the ornamental member to the wheel comprising a plurality of clips having bases secured to the back of the ornamental member by welding so as to leave front surface of the ornamental member absolutely continuous and capable of receiving a fine and unbroken finish, each of said clips having a portion extending axially and radially inwards and engaging the radially inner edge of one of said openings and having an out-turned cam end to facilitate the entry of the clip into the aperture.

GEORGE ALBERT LYON.